United States Patent [19]

Shirahata et al.

[11] 4,333,985

[45] Jun. 8, 1982

[54] MAGNETIC RECORDING MEDIUM

[75] Inventors: Ryuji Shirahata; Akio Yanai; Tatsuji Kitamoto, all of Odawara, Japan

[73] Assignee: Fuji Photo Film Co., Ltd., Kanagawa, Japan

[21] Appl. No.: 257,286

[22] Filed: Apr. 24, 1981

[30] Foreign Application Priority Data

Apr. 24, 1980 [JP] Japan ................................ 55-54609

[51] Int. Cl.³ .............................................. B32B 15/08
[52] U.S. Cl. .................................... 428/336; 428/462; 428/463; 428/522; 428/694; 428/900
[58] Field of Search ............... 428/336, 462, 463, 522, 428/694, 900

*Primary Examiner*—Bernard D. Pianalto
*Attorney, Agent, or Firm*—Sughrue, Mion, Zinn, Macpeak and Seas

[57] ABSTRACT

A magnetic recording medium is described comprising a protective layer including at least one substance selected from the group consisting of poly(paraxylylene), poly(monochloroparaxylylene), and poly(dichloroparaxylylene) formed on a magnetic recording layer comprising a thin ferromagnetic metal film.

3 Claims, No Drawings

MAGNETIC RECORDING MEDIUM

BACKGROUND OF THE INVENTION

This invention relates to a magnetic recording medium comprising a thin ferromagnetic metal film as a magnetic recording layer, and more particularly to a magnetic recording medium having a protective layer high in durability and weatherability, and having a good running property.

Magnetic recording media commonly used in the art are of "coated type", and are typically prepared by applying to a nonmagnetic support a dispersion of a particulate magnetic material such as a magnetic powder or ferromagnetic alloy powder, e.g., $\gamma\text{-Fe}_2\text{O}_3$, Co-doped $\gamma\text{-Fe}_2\text{O}_3$, $\text{Fe}_3\text{O}_4$, Co-doped $\text{Fe}_3\text{O}_4$, a berthollide (e.g., an alloy of variable proportions) or $\gamma\text{-Fe}_2\text{O}_3$ and $\text{Fe}_3\text{O}_4$, and $\text{CrO}_2$ in an organic binder such as vinyl chloride-vinyl acetate copolymer, styrene-butadiene copolymer, epoxy resin, or polyurethane resin. As the demand for recording in higher density has increased, reserch has increased including research directed to magnetic recording media of "non-binder type", wherein a magnetic recording layer comprising a thin ferromagnetic metal film formed, e.g., by a vapor deposition technique such as vacuum evaporation, sputtering or ion plating, or a plating technique such as electroplating or electroless plating, rather than by using a binder, and efforts have been made to develop a commercial product of this type.

The conventional magnetic recording medium of coated type typically uses a magnetic material made of a metal oxide having a smaller saturation magnetization than a ferromagnetic metal, and using such a material it becomes futile to try to increase the recording density beyond a certain point by reducing the thickness of the magnetic layer, because it results in low signal output. Furthermore, the manufacture of such a recording medium involves complicated procedures and requires additional facilities for solvent recovery or pollution control. The magnetic layer of the magnetic recording medium of the non-binder type is made by forming a thin layer of a ferromagnetic metal having a greater saturation magnetization than the metal oxide, without using a nonmagnetic substance such as binder. Accordingly, a very thin magnetic recording medium suitable for high density recording can be produced by such a procedure.

It is considered desirable, both theoretically and empirically, that a magnetic recording medium capable of high-density recording should have high coercive force and should have a thickness as small as practically possible, and it is thought that the magnetic recording medium of the non-binder type can be made one-tenth as thick as the magnetic recording medium of coated type, and also have a higher saturated magnetic flux density than the coated type.

Two important requirements that must be met by a magnetic recording medium, and particularly a magnetic recording type, using a thin ferromagnetic metal film as the magnetic layer are that it should have great resistance to corrosion and wear, and exhibit stability during running of the tape. During recording, reproduction, and erasure of magnetic signals, the magnetic recording medium moves very quickly over the magnetic head, and in such mode, it must run smoothly and produce stable output without being worn or damaged by contact with the head. It is also required that the signal recorded not be attenuated or lost because of corrosion or other phenomena taking place during storage of the magnetic recording medium.

Few ferromagnetic metal layers are capable of withstanding the severe conditions under which magnetic recording and reproduction are performed, and therefore protective layers are desirably formed on the surface of such ferromagnetic metal layers. Effective protective layers must be made of a material which is hard, forms a thin, uniform layer on the substrate, and is strongly bonded to the substrate. A coating which easily separates from or wears off on the substrate under hostile environments provides insufficient protection for the underlying magnetic recording layer, and also causes problems due to fragments of the separating coating. Another proposed solution to the problem involves forming a protective layer of electroplated rhodium. Other methods for providing a protective layer on the magnetic layer of the magnetic recording medium of non-binder type include: (1) a technique of oxidizing the surface of a thin cobalt-containing ferromagnetic metal film by exposing it to a suitable temperature and humidity, as described in Japanese Patent Publication No. 20025/67 and U.S. Pat. No. 3,353,166; (2) a technique of contacting a thin magnetic alloy film with nitric acid, treating the same with heat to form an oxide film on the surface, and impregnating the film with a lubricant, as described in British Pat. No. 1,265,175; and (3) a technique for depositing, by vacuum evaporation under a suitable degree of vacuum, a vapor of chromium on the surface of a thin ferromagnetic metal film to thereby form a layer composed of a mixture of chromium and chromium oxide, as described in Japanese Patent Publication No. 4393/70. Protective layers comprising nonmagnetic metals such as Si, Al, Ti, Sn, In, or Zn or oxides or nitrides thereof are also known. All these protective layers have achieved some, but nevertheless unsatisfactory, improvement in wear resistance and durability, and the running property of magnetic recording media coated with such protective layers is far from being satisfactory.

SUMMARY OF THE INVENTION

Therefore, the primary object of this invention is to provide a magnetic recording medium, including a magnetic recording layer comprising a thin ferromagnetic metal film, having a protective layer whose wear resistance, durability and running property are better than those of conventional protective layers.

Such object of this invention is achieved by providing a magnetic recording medium comprising a protective layer consisting of at least one substance selected from the group consisting of poly(paraxylylene), poly(monochloroparaxylylene), and poly(dichloroparaxylylene) is formed on a thin ferromagnetic metal film formed by electroplating, electroless plating, gas-phase plating, sputtering, vacuum evaporation, ion plating, or other suitable means.

DETAILED DESCRIPTION OF THE INVENTION

The poly(paraxylylene), poly(monochloroparaxylylene), and poly(dichloroparaxylylene) used in forming the protective layer of this invention have the following respective formulae:

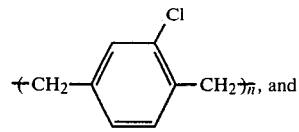

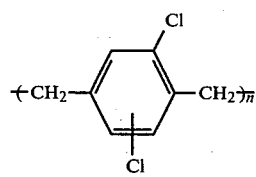

A protective layer of these polymers is formed by gas-phase, thermal decomposition vacuum evaporation. In a preferred embodiment of the gas-phase thermal decomposition vacuum evaporation, cyclodiparaxylylene, Cl-substituted cycloparaxylene or a mixture thereof is decomposed thermally by heating to a temperature of from about 450° C. to 700° C., and a gas flow of the paraxylylene radical vapor obtained is introduced onto the magnetic layer and cooled to a temperature lower than 100° C. to form a polymer or copolymer film. To achieve the desired protecting effect and to prevent output drop that is caused by spacing loss due to the gap between the magnetic recording surface and magnetic head, the protective layer generally has a thickness of from about 0.002 to 0.3 μm, and preferably from 0.005 to 0.2 μm.

The thin ferromagnetic metal film used in this invention is prepared by vapor deposition or plating of a ferromagnetic metal such as iron, cobalt or nickel, or a ferromagnetic alloy such as Fe-Co, Fe-Ni, Fe-B, Co-Ni, Fe-Si, Fe-Rh, Fe-V, Co-P, Co-B, Co-Si, Co-V, Co-Y, Co-La, Co-Ce, Co-Pr, Co-Sm, Co-Mn, Co-N, Fe-N, Fe-Co-Ni, Co-Ni-P, Co-Ni-B, Co-Ni-Ag, Co-Ni-Nd, Co-Ni-Ce, Co-Ni-Zn, Co-Ni-Cu, Co-Ni-Hg, Co-Ni-W, Co-Ni-Re, Co-Mn-P, Co-Fe-P, Co-Zn-P, Co-Pb-P, Co-Sm-Cu, Co-Fe-N, Co-Ni-Zn-P, Co-Ni-Fe-B, Co-Ni-Fe-P, or Co-Ni-Mn-P. Vapor deposition is a technique wherein an element or a compound containing that element is deposited on the substrate in the form of vapor or ionized vapor, and variations of this technique include vacuum evaporation, sputtering, ion plating, and chemical vapor deposition. Plating refers to a technique wherein an element or a compound containing that element is deposited from a liquid phase by electroplating or electroless plating.

For the formation of the ferromagnetic metal layer of this invention by vapor deposition, see, for example, L. Holland, "Vacuum Deposition of Thin Films", Chapman & Hall Ltd., 1956; L. I. Maissel & R. Gland, "Handbook of Thin Film Technology", McGraw-Hill Co., 1970; U.S. Pat. Nos. 2,671,034, 3,329,601, 3,342,632, 3,342,633, 3,516,860, 3,615,911, 3,625,849, 3,700,500, 3,772,174, 3,775,179, 3,787,237 and 3,856,579. For the formation of the ferromagnetic metal layer by plating, see, for example, W. Goldie, "Metallic Coating of Plastics", Electro-Chemical Publications Ltd., 1968, U.S. Pat. Nos. 3,116,159, 3,138,479, 3,219,471, 3,227,635, 3,238,061, 3,267,017, 3,353,986, 3,360,397, 3,362,893, 3,416,932, 3,446,657, 3,549,417, 3,578,571, 3,637,471 and 3,672,968.

The nonmagnetic support used in this invention typically has a thickness in the range of from about 4 to 50μ and is flexible, and the ferromagnetic metal layer has a thickness in the range of from about 0.02 to 5μ, and preferably from 0.05 to 2μ. The support used in this invention is typically made of a plastic base such as cellulose acetate, nitrocellulose, polyamide, polymethyl methacrylate, polytetrafluoroethylene, polytrifluoroethylene, a polymer or copolymer of α-olefin such as ethylene or propylene, a polymer of copolymer of vinyl chloride, polyvinylidene chloride, polycarbonate, polyimide, or a polyester such as polyethylene terephthalate or polyethylene naphthalate. The support may also be made of a metal such as aluminum, brass, or stainless steel, or a glass or ceramic material. The support may be in the form of tape, sheet, card, disc or drum.

A magnetic recording medium and particularly a magnetic tape composed solely of a nonmagnetic support and a thin ferromagnetic metal film that is formed by plating or vacuum evaporation does not run smoothly because there of friction caused by the ferromagnetic layer contacting the magnetic head, such that the ferromagnetic layer is scraped by the head, and chips resulting from scraping build up on the head to cause a significant drop in the output of magnetic recording. Furthermore, when the medium is exposed to a hot and humid atmosphere (e.g., 60° C., relative humidity(RH)90%) for an extended period, separation of the metal layer, formation of hydroxide and corrosion reduce the surface properties and saturated magnetic flux density of the medium, and the resulting magnetic recording medium becomes unsuitable for use in magnetic recording/reproduction. However, these problems are solved satisfactorily by a magnetic recording medium having a protective layer according to this invention.

This invention is now described in greater detail by reference to the following examples which are given here for illustrative purposes only, and are not intended to limit the scope of the invention.

EXAMPLE 1

A Co-P (Co=98 wt%, P=2 wt%) magnetic layer was formed in a thickness of 0.15 μm on a polyethylene terephthalate film tape (½ inch wide, 25 μm thick) by a continuous electroless plating machine using a plating bath of the formulation specified below (pH=7.3, bath temperature=85° C.). In an activating pretreatment for electroless plating, Catalyst 6F and Accelerator 19 of the Shipley Co., U.S.A. were used.

Cobalt chloride ($CoCl_2.6H_2O$): 9.5 g/l
Sodium hypophosphite ($NaH_2PO_2.H_2O$): 5.3 g/l
Ammonium chloride: 10.7 g/l
Citric acid: 26.5 g/l
Boric acid: 30.9 g/l A polyparaxylylene film having a thickness of 0.7 μm was formed on the resulting Co-P magnetic layer by the following method: diparaxylylene dimer was vaporized at 180° C. and 1 Torr, supplied to a heat decomposition zone (680° C.) where it was decomposed thermally, and the decomposed product was supplied to a polymerization zone (room temperature and 0.5 Torr) wherein the polyparaxylylene film was formed on the magnetic layer.

The magnetic tape thus produced (hereunder referred to as Sample A) ran smoothly in a VHS(video home system) video tape recorder, producing stable output. A test was conducted wherein the same part of the sample was kept in contact with the rotating magnetic head, and it was 1230 seconds before the head no longer produced output. A tape Sample B, identical to Sample A except for having no protective layer lost output in only 4 seconds when tested in the same manner.

EXAMPLE 2

A thin magnetic Co-Ni (95:5 weight ratio) layer was formed on a polyethylene terephthalate film (15 μm thick) by oblique vacuum evaporation in a continuous vacuum deposition system, as disclosed in U.S. Pat. No. 3,342,632. The angle of incidence was 75°, the degree of vacuum was $1.0 \times 10^{-5}$ Torr, and the thickness of the magnetic layer was 0.2μ. A polu(monochloroparaxylyene) film having a thickness of 0.1μm was formed on the resulting magnetic layer in the following manner: a di(monochloroparaxylylene) dimer was vaporized at 170° C. and 0.5 Torr, supplied to a heat decomposition zone (750° C.) where it was decomposed thermally, and the decomposed product was supplied to a polymerization zone (room temperature and 0.1 Torr) wherein the poly(monochloroparaxylylene) film was formed on the thin magnetic layer.

The magnetic tape thus produced (Sample C) ran smoothly in a VHS video tape recorder, producing stable output. A tape Sample D, identical to Sample C except for having no poly(monochloroparaxylylene) protective layer produced squeal, and its running was formed to be very poor. As in Example 1, a test was conducted wherein the same part of each sample was kept in contact with the rotating magnetic head, and no scratches were formed on Sample C even after running for more than 600 seconds, whereas the thin magnetic layer came off the surface of Sample D in less than 5 seconds.

The weatherability of Samples C and D was checked by demagnetizing them in a moist atmosphere (60° C., RH 90%). The value of Bm7/Bm0 (wherein Bm0 was the initial saturated magnetic flux density, and Bm7 was the saturated magnetic flux density of the samples stored in the defined atmosphere for 7 days) was 0.97 for Sample C, and 0.80 for Sample D.

The above results show that the magnetic recording medium having a protective layer according to this invention has high durability and weatherability, and a good running property.

While the invention has been described in detail and whith reference to specific embodiments thereof, it will be apparent to one skilled in the art that various changes and modifications can be made therein departing from the spirit and scope thereof.

What is claimed is:

1. A magnetic recording medium comprising a protective layer composed of at least one substance selected from the group consisting of poly(paraxylylene), poly(monochloroparaxylylene), and poly(dichloroparaxylylene), formed on a magnetic recording layer comprising a thin ferromagnetic metal film.

2. A magnetic recording medium as in claim 1 wherein the thickness of the protective layer is from about 0.002 to 0.3 μm.

3. A magnetic recording medium as in claim 1 wherein the thickness of the protective layer is from about 0.005 to 0.2 μm.

* * * * *